Oct. 30, 1928.                  W. E. DEAN                  1,689,231
                          BRAKE INDICATING DEVICE
                            Filed Jan. 8, 1927
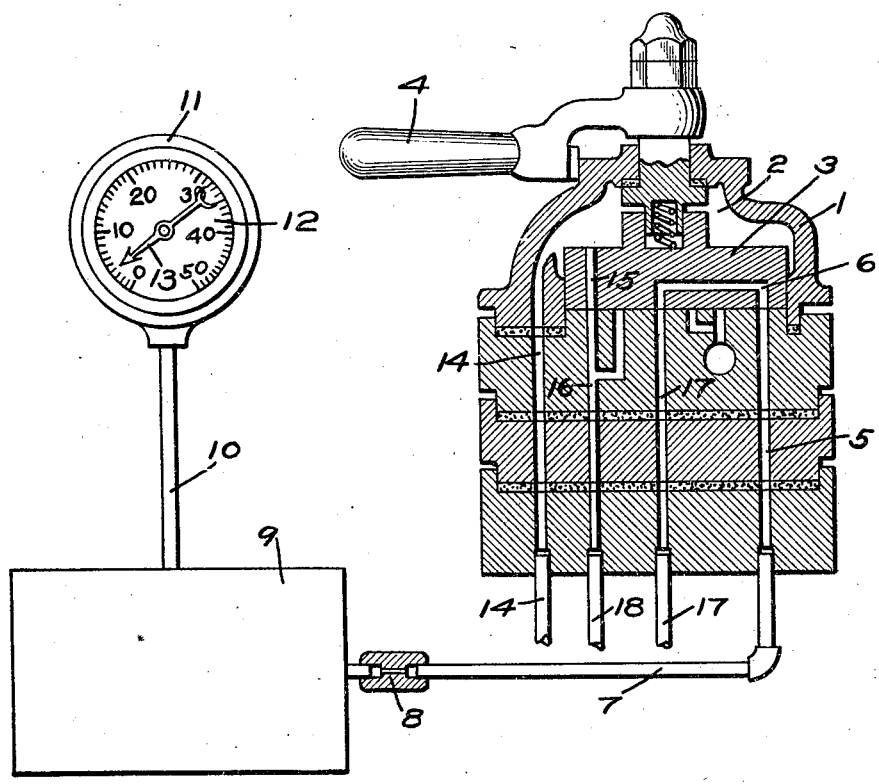
INVENTOR
WILLIAM E. DEAN
BY Wm. M. Cady
ATTORNEY Patented Oct. 30, 1928.

1,689,231

UNITED STATES PATENT OFFICE.

WILLIAM E. DEAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-INDICATING DEVICE.

Application filed January 8, 1927. Serial No. 159,845.

This invention relates to indicating devices and more particularly to a time indicator adapted to be employed on a locomotive, in conjunction with the usual fluid pressure brake equipment.

In charging the brake pipe, the automatic brake valve device is usually placed temporarily in release position, in which fluid under pressure flows directly from the main reservoir to the brake pipe. The time the brake valve is permitted to remain in release position is limited, so as to prevent charging the auxiliary reservoirs of the fluid pressure brake system, on the front of the train, to a pressure higher than the adjustment of the feed valve device and this time varies according to whether the brake pipe is being initially charged or the brakes are being released after an application of the brakes.

The operator has no means of knowing the length of time he leaves the brake valve in release position. The use of a watch is impracticable, and mere judgment of time by the engineer is too uncertain and unreliable.

The principal object of my invention is to provide means whereby the time the brake valve remains in release position is indicated on a gage or other indicating device.

In the accompanying drawing, the single figure is a sectional view of an automatic brake valve device, showing my invention applied thereto.

As shown in the drawing, the automatic brake valve device 1 may comprise a casing having a chamber 2 containing a rotary valve 3, adapted to be operated by a handle 4.

According to my invention, a reservoir 9 is provided, and connected to said reservoir through a pipe 10 is a fluid pressure operated gage 11. The reservoir 9 is connected through a pipe 7, containing a choke 8, with a passage 5 in the brake valve casing, leading to the seat of the rotary valve 3.

A pipe and passage 17 is connected to the usual feed valve device (not shown), and in release position of the rotary valve 3, the passage 17 is connected through a cavity 6 with passage 5.

In operation, with the brake valve in release position, fluid under pressure from the main reservoir (not shown) flows through pipe and passage 14 to chamber 2 of the brake valve device 3 and thence through port 15 in said rotary valve and passage 16 to the brake pipe 18.

In release position, fluid under pressure from the feed valve device is supplied from pipe 17 through cavity 6, passage 5, and pipe 7 to the passage 9, and said reservoir is then charged and the pressure of fluid therein increases at a rate according to the size of the choke 8. The size of the choke and the volume of reservoir 9 are so proportioned, that with the gage marked as shown, the pointer 13 will be rotated by the increase in fluid pressure at such a rate that when a certain number of seconds has elapsed, the corresponding number is indicated by the pointer. For example, when the brake valve remains in release position for 10 seconds, the gage pointer will pass over the numeral 10 on the dial 12, showing that 10 seconds has elapsed.

As illustrated, the source of fluid under pressure from which the timing reservoir 9 is charged, is the usual feed valve device normally employed to control the charging of the brake pipe in running position of the automatic brake valve device, but any other means may be employed from which fluid at a constant pressure can be supplied to the reservoir 9.

In all positions of the automatic brake valve device, except release, the timing reservoir is vented to the atmosphere, so that whenever the brake valve device is moved to release position, the automatic timing feature will be effective.

Having now described my invention, what I claim as new and desire to secure by Letters Patent, is:—

1. In a fluid pressure brake system, the combination with an engineer's brake valve device having a release position, of a reservoir adapted to be supplied with fluid under pressure at a predetermined rate, and a gage operated by the increase in pressure in said reservoir for indicating the period of time the brake valve device remains in release position.

2. In a fluid pressure brake system, the combination with an engineer's brake valve device having a release position, of a reservoir adapted to be supplied with fluid at a predetermined pressure and at a predetermined rate, and a gage operated by the increase in pressure in said reservoir for indicating the time the brake valve device remains in release position.

3. In a fluid pressure brake system, the combination with an engineer's brake valve device having a release position and a passage adapted to be supplied with fluid under pressure from a feed valve device, of a reservoir adapted to be connected to said passage in the release position of said brake valve device and a gage operated by the pressure of fluid in said reservoir and marked to indicate time elapsing as the pressure in said reservoir increases.

In testimony whereof I have hereunto set my hand.

WILLIAM E. DEAN.